United States Patent [19]
Anderson

[11] 4,030,301
[45] June 21, 1977

[54] PUMP STARTING SYSTEM FOR SEA THERMAL POWER PLANT

[75] Inventor: James H. Anderson, York, Pa.

[73] Assignee: Sea Solar Power, Inc., York, Pa.

[22] Filed: June 24, 1976

[21] Appl. No.: 699,245

[52] U.S. Cl. .................................. 60/641; 60/618; 60/656

[51] Int. Cl.² ...................... F03G 7/04; F01K 23/06

[58] Field of Search ............... 60/39.18 B, 39.18 R, 60/616, 618, 641, 646, 655, 656

[56] References Cited

UNITED STATES PATENTS

| | | | |
|---|---|---|---|
| 2,006,985 | 7/1935 | Claude et al. | 60/641 X |
| 3,826,096 | 7/1974 | Hrusch | 60/656 X |

FOREIGN PATENTS OR APPLICATIONS

| | | | |
|---|---|---|---|
| 474,000 | 2/1915 | France | 60/616 |

Primary Examiner—Allen M. Ostrager
Assistant Examiner—Stephen F. Husar
Attorney, Agent, or Firm—Kemon & Estabrook

[57] ABSTRACT

In a turbine driven power generating plant of the type using for example a hydrocarbon or halocarbon as the working fluid operating on or near the surface of an ocean, warm surface water is used as a source of heat for a boiler and cold water pumped from substantial depths is used to condense the working fluid after it has been expanded through the turbine. An auxiliary power source for starting the water pumps of the main system includes a prime mover driving a compressor which in turn supplies a high energy working fluid to a turbine coupled to drive the water pumps. The turbine exhaust after being cooled in a heat exchanger by the cold water pumped from the ocean depths, is returned to the suction side of the compressor.

2 Claims, 3 Drawing Figures

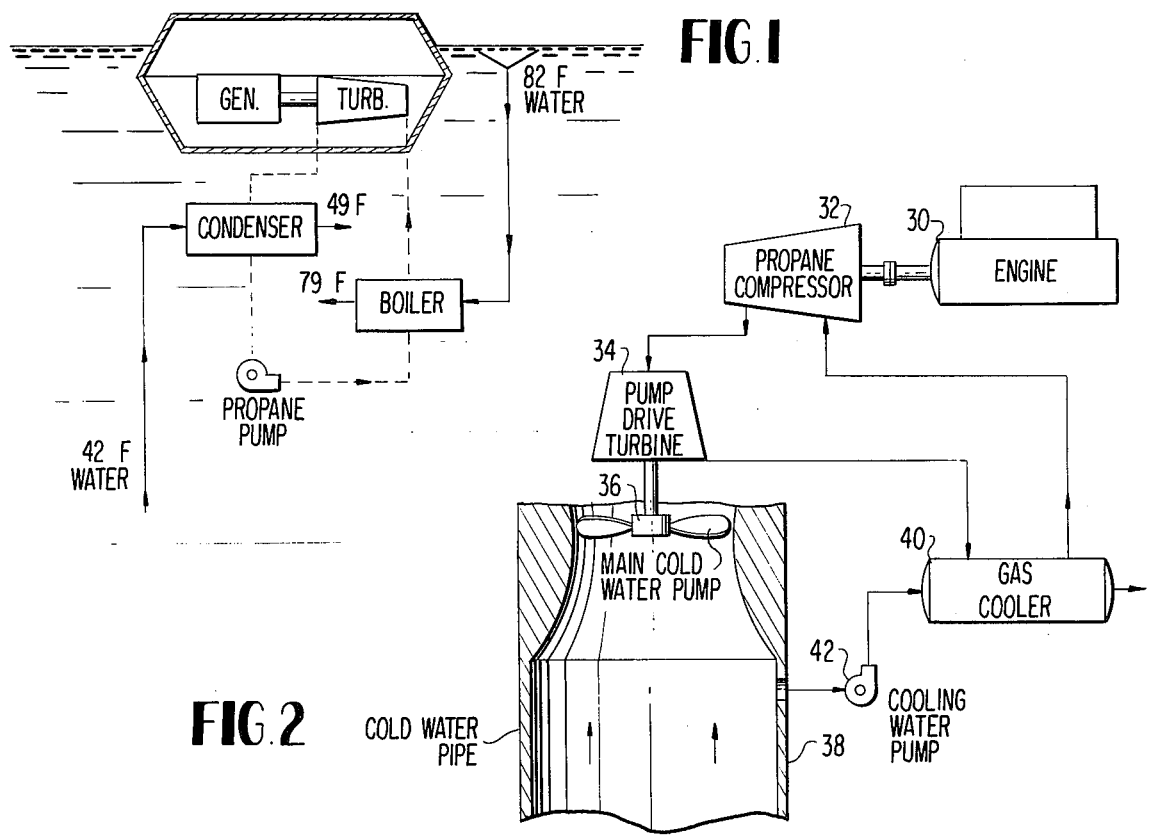
FIG.1
FIG.2
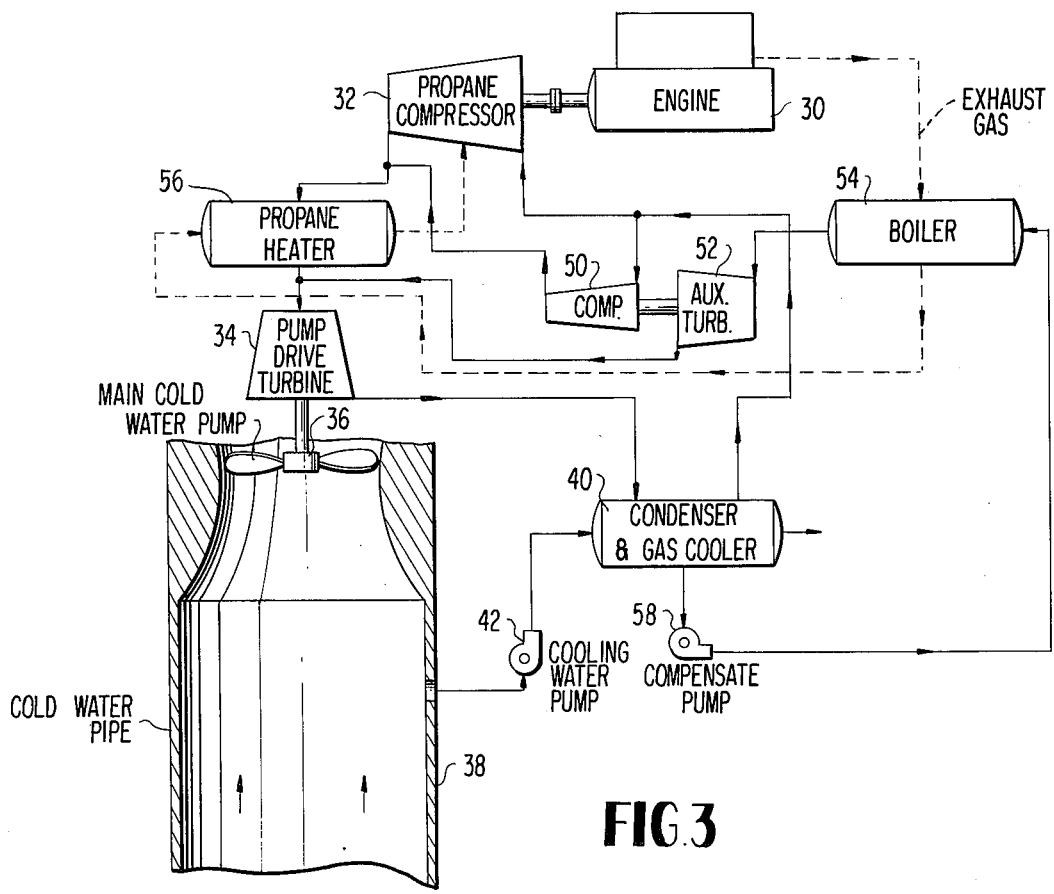
FIG.3

PUMP STARTING SYSTEM FOR SEA THERMAL POWER PLANT

BACKGROUND OF THE INVENTION

A sea thermal power plant of the type to which the present invention relates is disclosed in an article entitled "Power from the Sun by Way of the Sea", published in "Power+"for January and February of 1965. Briefly, the generating system disclosed includes a turbine driven generator and the boilder for the turbine is heated by warm ocean surface water and the turbine exhaust is condensed in a heat exchanger cooled by cold ocean water obtained by pumps driven from the system to elevate such water from substantial depths. It is necessary to start at least the cold water supply pumps to cause a sufficient pressure difference between vapor in the boiler and vapor in the condenser to cause flow of working fluid through the turbine to generate power.

BRIEF SUMMARY OF THE INVENTION

In order to start the water pumps in a power generating system of the type described in the above mentioned article, a prime mover such as a diesel engine is coupled to drive a gas compressor. A pump drive turbine is supplied from the compressor and the turbine exhaust is cooled by the water supplied by the water pumps and is then returned to the suction side of the compressor. Once the main system is operating, the prime mover can be shut down and the pump drive turbine is supplied with working fluid directly from the main system. The auxiliary system is also useful to supply energy to a jet propulsion arrangement to position the main system with respect to ocean currents when the main system is shut down.

BRIEF DESCRIPTION OF THE DRAWINGS

FIG. 1 is a diagram of a basic power generating system of the type to which the present invention relates;

FIG. 2. is a diagram of the basic auxiliary power source in accordance with the present invention and;

FIG. 3 is a diagram of a modification of the basic system shown in FIG. 2.

DETAILED DESCRIPTION OF THE INVENTION

Referring first to FIG. 1, this is a simplified diagram of a sea thermal power generating plant of the type which is more fully disclosed in the above mentioned article in "Power". As shown in this figure, a turbine driven power generator is housed in a structure floating on or near the surface of an ocean. The boiler for supplying the turbine is heated by pumping to the boiler, relatively warm ocean surface water. The working fluid once it has been expanded thru the turbine, is condensed by pumping colder ocean water from substantial depths through the condenser.

The present invention finds primary utility in a system of the type shown in FIG. 1 in that it provides an alternate auxiliary source of power for the pumps which are needed in the system of FIG. 1 to supply the cold and hot water to the condenser and boiler respectively. The auxilary system is necessary when starting up the main system of FIG. 1 and at other times when for any other reason the main system is not operating.

Referring now to FIG. 2, a basic form of auxiliary power source for the pumps is shown and it includes a prime mover such as a diesel engine indicated at 30 which is directly coupled to a gas compressor 32. The compressor 32 supplies high temperature, high pressure fluid to a pump drive turbine 34 which is coupled directly or through gears to a pump 36 schematically indicated as located in a cold water pipe 38 supplying cold water to the condenser of FIG. 1. The exhaust from the pump drive turbine 34 is fed to a gas cooler 40 and then returned to the suction side of the compressor 32. The gas cooler 40 may be cooled with cold water from the pipe 38 supplied by a small cooling water pump 42. The pump 42 can be either electrically driven from a separate system not shown or it could be operated by a small gas turbine.

Since the system of FIG. 2 will be used primarily only at start up times for the main system, the actual working efficiency may not be too important. A more efficient system, however, is shown in FIG. 3 where the elements that are common to the two systems are identified by the same reference numerals.

In this figure, an auxiliary compressor 50 is connected in parallel with the main compressor 32. This compressor is driven from a turbine 52 which in turn is supplied with working fluid from a boiler 54 heated by the exhaust gas from the prime mover 30. Another heat exchanger 56 is connected between the outputs of the two compressors 32 and 50 and the input of the pump drive turbine 34. This heat exchanger is also heated by the exhaust gas from the prime mover 30. A condensate pump 58 supplies condensed liquid from the condenser 40 to the boiler 54 to complete the fluid circuit.

As will be apparent to those skilled in this art, the systems shown in FIGS. 2 and 3 and which are used at start up times for the main system of FIG. 1 can be shut down completely once the main system is operating and the pump drive turbines during normal operating conditions are supplied with working fluid from the main system.

While a preferred embodiment has been herein shown and described with reference to the attached figures of drawing, applicant claims the benefit of a full range of equivalents within the scope of the appended claims.

I claim:

1. In a power generating plant of the gaseous fluid turbine powered type for operation on or near the surface of an ocean and which uses ocean surface water as a source of heat for the boiler and cold water pumped from substantial depths to absorb heat from the working fluid, an auxiliary drive for the water pumps for starting up and other times when the main system is not operating comprising:
   a gas turbine connected to drive at least one of the pumps;
   a prime mover;
   a compressor connected to be driven by said prime mover;
   a gas cooler;
   means connecting said compressor, said turbine and said gas cooler in a closed fluid loop so that high pressure gas from said compressor supplies motive fluid to said gas turbine, the exhaust gas of said gas turbine being connected to said cooler and back to the suction side of said compressor.

2. The combination defined by claim 1 and further including;
   an auxiliary compressor connected in parallel with said compressor;

a boiler heated by exhaust gas from said prime mover;

an auxiliary turbine connected to drive said auxiliary compressor and powered by said boiler;

a gas heater connected between said compressors and said gas turbine also heated by exhaust gas from the said prime mover;

and means supplying condensate from said gas cooler to said boiler.

* * * * *